(12) United States Patent
Kosche et al.

(10) Patent No.: US 6,678,796 B1
(45) Date of Patent: Jan. 13, 2004

(54) SYSTEM AND METHOD FOR SCHEDULING MEMORY INSTRUCTIONS TO PROVIDE ADEQUATE PREFETCH LATENCY

(75) Inventors: Nicolai Kosche, San Francisco, CA (US); Peter C. Damron, Fremont, CA (US); Joseph Chamdani, Santa Clara, CA (US); Partha Pal Tirumalai, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 583 days.

(21) Appl. No.: 09/679,431

(22) Filed: Oct. 3, 2000

(51) Int. Cl.[7] .................. G06F 12/00; G06F 15/00; G06F 9/30
(52) U.S. Cl. .................. 711/137; 712/207; 711/213
(58) Field of Search ................. 711/133, 137, 711/140, 135, 213; 712/207, 237, 206, 239; 717/161

(56) References Cited

U.S. PATENT DOCUMENTS

| 5,377,336 A | * 12/1994 | Eickemeyer et al. ........ 712/207 |
| 5,493,675 A | 2/1996 | Faiman, Jr. et al. |
| 5,627,982 A | 5/1997 | Hirata et al. |
| 5,948,095 A | * 9/1999 | Arora et al. ................ 712/200 |
| 6,317,811 B1 | * 11/2001 | Deshpande et al. ......... 711/137 |

OTHER PUBLICATIONS

Mowry, Tolerating Latency Through Software–Controlled Data Prefetching –1994, vol. 55/07–B of Dissertation Abstracts International, p. 2930 —221 pages.*

* cited by examiner

Primary Examiner—Donald Sparks
Assistant Examiner—Bao Quoc Truonc

(57) ABSTRACT

A method and apparatus for scheduling instructions to provide adequate prefetch latency is disclosed during compilation of a program code in to a program. The prefetch scheduler component of the present invention selects a memory operation within the program code as a "martyr load" and removes the prefetch associated with the martyr load, if any. The prefetch scheduler takes advantage of the latency associated with the martyr load to schedule prefetches for memory operations which follow the martyr load. The prefetches are scheduled "behind" (i.e., prior to) the martyr load to allow the prefetches to complete before the associated memory operations are carried out. The prefetch schedule component continues this process throughout the program code to optimize prefetch scheduling and overall program operation.

23 Claims, 4 Drawing Sheets

SYSTEM AND METHOD FOR SCHEDULING MEMORY INSTRUCTIONS TO PROVIDE ADEQUATE PREFETCH LATENCY

BACKGROUND OF THE INVENTION

1. Field of the Invention

This invention pertains generally to software prefetching algorithms. More particularly, the invention is a software method and apparatus for scheduling instructions to provide adequate prefetch latency.

2. The Prior Art

Current computer systems include, among other things, a memory system and a processing unit (or processor or central processing unit (CPU)). A memory system serves as a repository of information, while the CPU accesses information from the memory system, operates on it, and stores it back.

However, it is well known that CPU clock speeds are increasing at a faster rate than memory speeds. When a processor attempts to read a memory location from the memory system, the request is "very urgent". That is, in most computer systems, the processor stalls or waits while the memory system provides the data requested to the CPU. The "latency" of the memory is the delay from when the CPU first requests data from memory until that data arrives and is available for use by the CPU.

A cache is a special high-speed memory in addition to the conventional memory (or main memory). FIG. 1 depicts a conventional hierarchical memory system, where a CPU is operatively coupled to a cache, and the cache is operatively coupled to the main memory. By placing the cache (very fast memory) in front of the main memory (large, slow memory), the memory system is able to satisfy most requests from the CPU at the speed of the cache, thereby reducing the overall latency of the system.

When the data requested by the CPU is in the cache (known as a "hit"), the request is satisfied at the speed of the cache. However, when the data requested by the CPU is not in the cache (known as a "miss"), the CPU must wait until the data is provided from the slower main memory to the cache, and then to the CPU, resulting in greater latency. In memory-bound applications, such as database servers and other commercial applications, data requests very often miss the cache, as is generally known in the art.

To address the problem of latency and to increase the "hit" to "miss" ratio associated with cache memory, many modern computer systems have introduced instructions for prefetching data from memory to cache. For example, instructions set architectures (ISA's), such as SPARC™ V9, support software data prefetch operations. The details of implementing prefetch operations have been left to the designers of optimizing compilers to find ways to reduce the frequency of cache misses. In general, prefetch instructions require adequate latency for proper operation.

For many scientific applications that work on arrays, the CPU generally operates from a contiguous group of memory. Thus, predicting which areas of memory will be required for a memory operation may be carried out relatively far in advance (in CPU cycles) of the memory operation, and scheduling prefetches is a relatively nominal task by placing the prefetch far enough in advance of the memory operation to cover the prefetch latency.

For database applications and other commercial applications, however, predicting which areas of memory will be required is much more difficult, in large part because there is normally insufficient latency time (in CPU cycles) between the address forming operation and the memory operation (associated with the address) to cover the prefetch latency (the amount of the time for carrying out the prefetch instruction). In these cases, the prefetch cannot be simply moved far enough in advanced of the memory operation in order to cover the prefetch latency.

Accordingly, there is a need for a method and apparatus which schedules memory instructions to provide adequate latency for proper prefetch operation. The present invention satisfies these needs, as well as others, and generally overcomes the deficiencies found in the background art.

BRIEF DESCRIPTION OF THE INVENTION

The present invention is a method and apparatus embodied in software suitable for use with compilation of source code. The invention further relates to machine readable media on which are stored embodiments of the present invention. It is contemplated that any media suitable for retrieving instructions is within the scope of the present invention. By way of example, such media may take the form of magnetic, optical, or semiconductor media.

The present invention also relates to a method and use of prefetch operations to load data from memory into a cache. It is contemplated that the invention may be used for loading data from conventional main memory as well as other "slow" data storage structures such as a disk storage or a network storage, for example. Although, the invention is described herein with respect to a single cache, it is contemplated that any suitable cache arrangement (e.g., various levels of cache) is within the scope of the present invention.

In its most general terms, the invention comprises software for scheduling memory operations to provide adequate prefetch latency. The invention is generally used in conjunction and incorporated into compilation software (compiler), which converts source code into a compiled program (or executable file). During compilation, the source code is converted into an intermediary "program code" which is processed by the compiler. After the compiler has completed processing the program code, a compiled program is generated from the program code.

More particularly, the invention is embodied in a prefetch scheduler component having a martyr load locating routine and a prefetch placement routine.

The prefetch scheduler sorts memory operations (such as loads) into two groups: loads that are not likely to miss the cache (hit candidates) and loads that are likely to miss the cache (miss candidates). Various algorithms known in the art may be used for carrying out this classification.

The martyr load locating routine carries out the operation of locating memory operations within the program code which are likely to miss the cache. The martyr load locating routine then designates one of the memory operations which is likely to miss the cache as a "martyr" load and removes any prefetch associated with the martyr load operation. As a result, the martyr load will have to access the requested data from memory, thereby inherently generating latency (i.e, CPU stall).

The present invention utilizes the latency created by the martyr load to provide the necessary latency for other prefetches to complete. More particularly, the prefetch placement routine carries out the operation of locating one or more "succeeding" memory operations, subsequent to the martyr load. The prefetch placement routine then schedules prefetches associated with each succeeding memory operation "behind" (i.e., prior to) the martyr load operation. Since the martyr load will generate latency to carry out its operation, the same latency is used to allow the scheduled prefetches (placed prior to the martyr load) to complete.

The number of prefetches which may be placed "behind" the martyr load varies according to the hardware implementation on which the program will execute. For example, the UltraSPARC-III™ chip provides for eight (8) in-flight memory operations to be carried out in operation. In this case, the number of prefetches to be placed "behind" the martyr load would be seven (7), the eighth memory operation occupied by the martyr load.

The prefetch scheduler component as described herein is used in conjunction with a compiler. The compiler normally includes other compilation components for carrying out other compilation tasks as is known in the art. In general, the compiler processes a program code (converted from a source code file) and generates a compiled file (or executable program). The prefetch scheduler component executes during this compilation process and carries out the method of the present invention.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
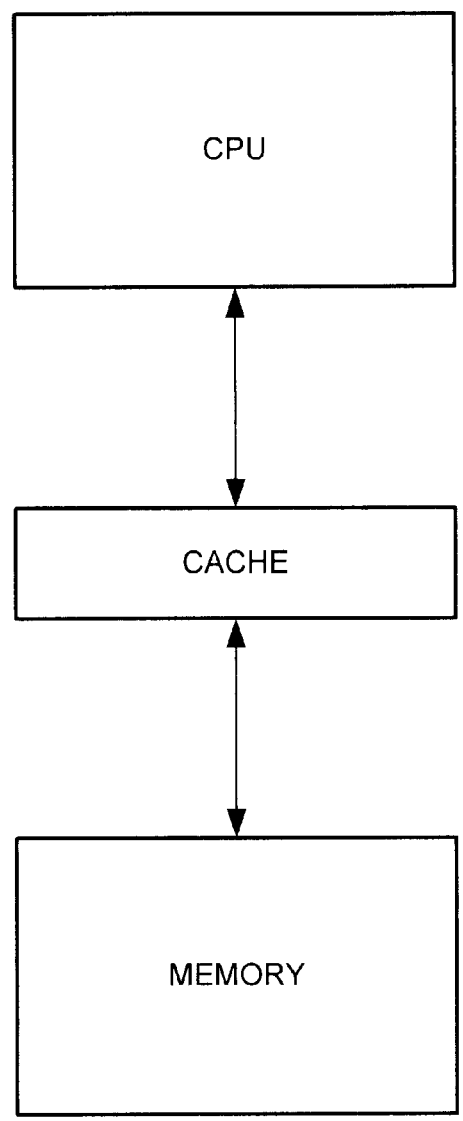
FIG. 1 is a functional block diagram depicting a conventional hierarchical memory system.
Figure 2:
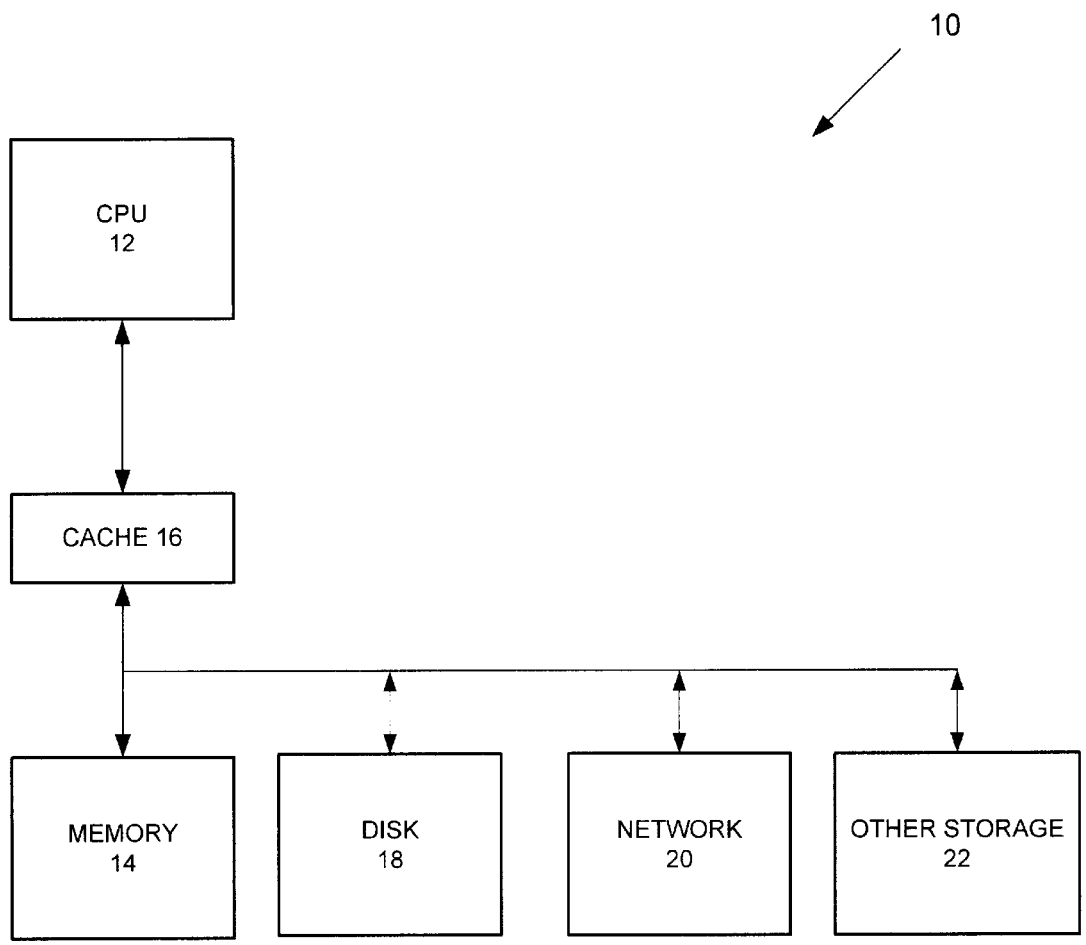
FIG. 2 is a functional block diagram depicting an illustrative hierarchical memory system suitable for use with the present invention.
Figure 3:
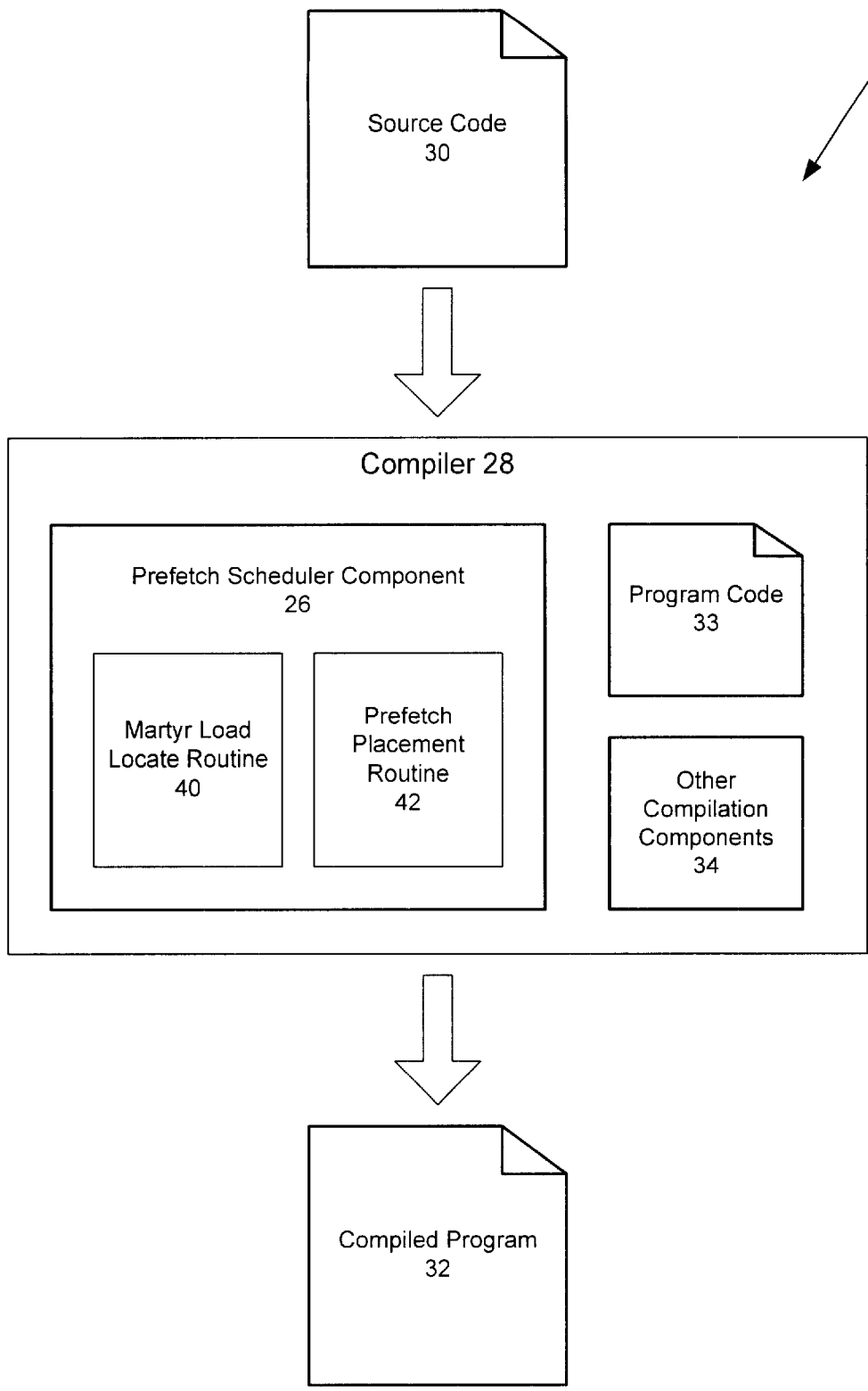
FIG. 3 is a functional block diagram depicting a compilation process using the prefetch scheduler component software of the present invention.
Figure 4:
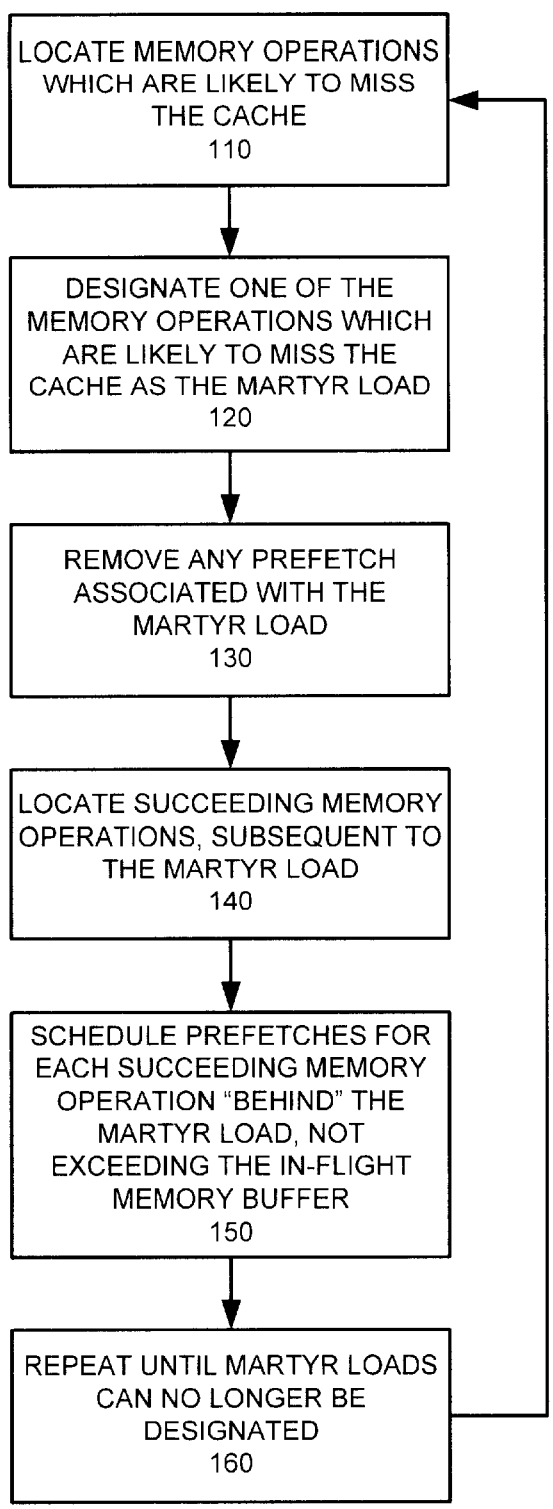
FIG. 4 is a logical flow diagram showing generally the general process associated with prefetch scheduler component in accordance with the present invention.

Referring more specifically to the drawings, for illustrative purposes the present invention is embodied in the apparatus shown FIG. 2 and FIG. 3 and the method outlined in FIG. 4. It will be appreciated that the apparatus may vary as to configuration and as to details of the parts, and that the method may vary as to details and the order of the steps, without departing from the basic concepts as disclosed herein. The invention is disclosed generally in terms of prefetch scheduler component system and method, although numerous other uses for the invention will suggest themselves to persons of ordinary skill in the art.

Referring first to FIG. 2, there is generally shown a functional block diagram of an illustrative hierarchical memory system 10 suitable for use with the present invention. As described above and in further detail below in conjunction with FIG. 4, the invention schedules prefetch operations as well as martyr load operations during compilation to provide the requisite latency for other prefetch operations to complete.

System 10 includes a CPU 12 which carries out the execution of the program. System 10 further includes main memory 14 operatively coupled to a cache 16. The cache 16 is operatively coupled to the CPU 12 as is well known in the art. The memory 14 serves as a repository of information in the system 10. The system 10 is further structured and configured to carry out prefetches from the main memory 14 to the cache 16.

Although the invention is described herein with respect to a single cache 16, it is contemplated that any suitable cache arrangement (e.g., various levels of cache) is within the scope of the present invention. Additionally, the present invention may also be suitable for use with a system supporting prefetch operations from other storage devices into the cache 18. For example, system 10 also shows a disk store 18, a network store 20, and other store 22, each operatively coupled to the cache 16. It is contemplated that the invention may be used for scheduling memory operations from the disk store 18, the network store 20 and/or the other store 22, as well as from the main memory 14 as described herein.

Referring next to FIG. 3, as well as FIG. 2, there is generally shown a functional block diagram of a compilation process 24 using the prefetch scheduler component software 26 of the present invention. In general, a compiler 28 is provided to translate or convert a source code file 30 into a compiled program 32 suitable for execution by the CPU 12. During compilation, the source code 30 is converted into an intermediary program file 33 which is processed by compiler. The compiler 28 includes the prefetch scheduler component software 26 of the present invention. The compiler 30 further includes other compilation components 34 for carrying other compilation tasks as is known in the art.

The prefetch scheduler component software 26 comprises a martyr load locate routine 40 and a prefetch placement routine 42. Prior to processing of the program code by the prefetch schedule component software 26 as described herein, the program code is normally preprocessed by one of the other compilation components 34 to perform initial code generation and optimization. For example, this might include common subexpression elimination, loop invariant code motion, prefetch insertion for memory operations expected to miss the cache, or other compilation techniques known in the art The martyr load locate routine 40 first inspects the program code under consideration to ascertain memory instructions (such as load instructions) which are likely to miss the cache 18. The present invention may employ conventional means or algorithms for determining whether a memory instruction will likely miss the cache. For example, the algorithm may classify load and store operations from the stack as memory operations which are going to hit the cache, while load and store operations which do not operate on the stack are classified as memory operations which are going to miss the cache. Programmer hints might also be used to identify memory instructions that are likely to miss the cache. Other algorithms are also contemplated for use with the present invention.

The martyr load locate routine 40 then selects one of the memory instructions likely to miss the cache as the "martyr load", and deletes any prefetch instruction associated with the martyr load instruction. The present invention assumes that on a significant number of occurrences the requisite data will not be in the cache 16, and the processor 12 will stall while the data associated with the memory instruction is obtained from the main memory 14. The present invention utilizes this stall to create sufficient latency for prefetches associated with memory operations succeeding (following) the selected martyr load instruction.

In particular, the prefetch placement routine 42 locates one or more "succeeding" memory operations, subsequent (in program flow) to the martyr load. The prefetch placement routine 42 then schedules prefetches associated with each succeeding memory operation "behind" (i.e., prior to) the martyr load operation. Since the martyr load will generate latency to carry out its operation, the same latency is used to allow the scheduled prefetches (placed prior to the martyr load) to complete.

The number of prefetches which may be placed "behind" the martyr load varies according to the hardware implementation on which the program will execute. For example, the UltraSPARC™ chip provides for eight (8) in-flight memory operations to be carries out in operation. In this case, the maximum number of prefetches to be placed "behind" the martyr load would be seven (7), the eighth memory operation occupied by the martyr load.

The prefetch scheduler component 26 continues processing the program code 33 in the same manner described above. Namely, the martyr load locate routine 40 inspects the program code for additional memory operations suitable for selection as martyr loads, as described above. For each memory operation selected as a martyr load, the martyr load locate routine 40 deletes any prefetch associated with the martyr load. The prefetch placement routine 42 then schedules additional prefetches associated with memory operations subsequent (in program flow) to the selected martyr load, as described above.

According to the algorithm provided by the prefetch scheduler component 26, prefetches are scheduled in the program code to utilize and take advantage of the inherent stalls created by the martyr loads which are selected by the martyr load locate routine 40. The resulting code thus enhances the operation of the compiled program by maximizing prefetch scheduling, previously unrealized in the prior art.

The method and operation of invention will be more fully understood with reference to the logical flow diagram of FIG. 4, as well as FIG. 2 and FIG. 3. FIG. 4 is a logical flow diagram showing generally the general process and operation associated with prefetch scheduler component 26 in accordance with the present invention. The order of actions as shown in FIG. 4 and described below is only exemplary, and should not be considered limiting.

Prior to processing of the program code by the prefetch schedule component software 26 as described in box 110 through 160 below, the program code 33 is normally pre-processed by one of the other compilation components 34 to perform initial code generation and optimization.

At box 110, the martyr load locate routine 40 locates memory operations which are likely to miss the cache. As described above, one or more conventional algorithms for ascertaining memory operations likely to miss the cache may be used. Box 120 is then carried out.

At box 120, the martyr load locate routine 40 then designates one of the memory operations which are likely to miss the cache as the martyr load. As described above, this latency associated with this martyr load will allow scheduled prefetches to complete. Box 130 is then carried out.

At box 130, the martyr load locate routine 40 then removes any prefetch associated with the martyr load. Accordingly, when the martyr load is carried out during operation, the data will most likely be retrieved from main memory rather than cache memory, and the processor will stall during this data retrieval. This stall (latency) is utilized for scheduling prefetches. Box 140 is then carried out.

At box 140, the prefetch placement routine 42 then processes the program code 22 to locate succeeding memory operations which follow (are subsequent to) the martyr load designated during box 120. These memory operations may benefit from the latency of the martyr load by scheduling prefetches for these memory operations "behind" (i.e., prior to) the martyr load. Box 150 is then carried out.

At box 150, the prefetch placement routine 42 schedules the prefetches for the memory operations determined during box 140. The prefetches are scheduled (located) prior to the martyr, so that the latency of the martyr load allows the prefetches to complete before the associated memory operations are carried out. As described above, the number of prefetches that are scheduled for corresponding memory operations vary according the hardware platform on which the program will execute. For example, where the hardware platform supports k in-flight memory operations, the prefetch placement routine 42 will schedule at most k-1 prefetches. Box 160 is then carried out.

At box 160, box 120 is repeated to continue processing the program code for additional martyr load designations. The process is repeated until martyr load can no longer be designated or would otherwise reduce the efficiency of the program's operation.

Accordingly, it will be seen that this invention provides a method and apparatus for scheduling instructions during the compilation of a program to provide adequate prefetch latency. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for scheduling memory operations into a program, said program executable in a device having a processor operatively coupled to a cache memory and to a main memory, said method comprising:

locating a first memory operation within said program which is likely to miss the cache;

removing any prefetches associated with said first memory operation without attempting to perform said prefetches:

locating at least one other (second) memory operation subsequent to said first memory operation; and scheduling a prefetch associated with said second memory operation prior to said first memory operation.

2. The method of claim 1, further comprising:

locating a plurality of succeeding memory operations, each subsequent to said first memory operation; and scheduling a prefetch associated with each said succeeding memory operation prior to said first memory operation.

3. The method of claim 2, wherein said processor further contains at least one memory queue, said scheduling a prefetch limited to scheduling only enough prefetches to not overflow said memory queue.

4. The method of claim 1, further comprising:

prior to locating said first memory operation, locating all memory operations within said program code which are likely to miss the cache; and inserting prefetches for each said all memory operations likely to miss the cache.

5. The method of claim 1, wherein said scheduling a prefetch includes inserting said prefetch.

6. The method of claim 1, wherein said main memory is a disk, said cache memory is a disk cache, and said memory operations are disk accesses.

7. The method of claim 1, wherein said main memory is a network, said cache memory is a network cache, and said memory operations are network accesses.

8. The method of claim 1, wherein said scheduling is performed by a compiler.

9. A program storage device readable by a machine, tangibly embodying a program of instructions executable by the machine to perform a method for scheduling memory operations into a program, said program executable in a device having a processor operatively coupled to a cache memory and to a main memory, said method comprising:

locating a first memory operation within said program which is likely to miss the cache;

removing any prefetches associated with said first memory operation without attempting to perform said prefetches;

locating at least one other (second) memory operation subsequent to said first memory operation; and scheduling a prefetch associated with said memory operation prior to said first memory operation.

10. The program storage device of claim 9, said method further comprising:

locating a plurality of succeeding memory operations, each subsequent to said first memory operation; and scheduling a prefetch associated with each said succeeding memory operation prior to said first memory operation.

11. The program storage device of claim 10, wherein said processor further contains at least one memory queue, said scheduling a prefetch limited to scheduling only enough prefetches to not overflow said memory queue.

12. The program storage device of claim 9, said method further comprising:

prior to locating said first memory operation, locating all memory operations within said program code which are likely to miss the cache; and inserting prefetches for each said all memory operations likely to miss the cache.

13. The program storage device of claim 9, wherein said scheduling a prefetch includes inserting said prefetch.

14. The program storage device of claim 9, wherein said main memory is a disk, said cache memory is a disk cache, and said memory operations are disk accesses.

15. The program storage device of claim 9, wherein said main memory is a network, said cache memory is a network cache, and said memory operations are network accesses.

16. The program storage device of claim 9, wherein said scheduling is preformed by a compiler.

17. A prefetch scheduler component apparatus for use in compiling a program code into a program, said program executable in a device having a processor operatively coupled to a cache memory and to a main memory, said apparatus comprising:

a martyr load locate routine coupled for communication with said program, said martyr load locate routine configured to locate a first memory operation within said program which is likely to miss the cache, said martyr load locate routine further configured to remove any prefetches associated with said first memory operation; and a prefetch placement routine coupled for communication with said program, said prefetch placement routine configured to locate at least one other (second) memory operation subsequent to said first memory operation, said prefetch placement routine further configured to schedule a prefetch associated with said second memory operation prior to said first memory operation.

18. The apparatus of claim 17, wherein said prefetch placement routine is further configured to locate a plurality of succeeding memory operations, each subsequent to said first memory operation, said prefetch placement routine further configured to schedule a prefetch associated with each said succeeding memory operation prior to said first memory operation.

19. The apparatus of claim 18, wherein said processor further contains at least one memory queue, said prefetch placement routine further configured to schedule only enough prefetches to not overflow said memory queue.

20. The apparatus of claim 17, wherein said prefetch placement routine is further configured to insert said prefetch.

21. The apparatus of claim 17, wherein said main memory is a disk, said cache memory is a disk cache, and said memory operations are disk accesses.

22. The apparatus of claim 17, wherein said main memory is a network, said cache memory is a network cache, and said memory operations are network accesses.

23. The apparatus of claim 17, wherein said scheduling is performed by a compiler.

* * * * *